United States Patent [19]

Michie, Jr. et al.

[11] Patent Number: 5,503,914

[45] Date of Patent: Apr. 2, 1996

[54] FILM EXTRUDED FROM AN IN SITU BLEND OF ETHYLENE COPOLYMERS

[75] Inventors: William J. Michie, Jr., Raritan; George E. Ealer, Whitehouse Station; Guylaine St. Jean, Somerset; Charles J. Sakevich, South Plainfield; Diane J. Rickman-Davis, Red Bank, all of N.J.

[73] Assignee: Union Carbide Chemcials & Plastics Technology Corporation, Danbury, Conn.

[21] Appl. No.: 272,260

[22] Filed: Jul. 8, 1994

[51] Int. Cl.$^6$ .......................... C08L 23/08; C08L 23/20; C08J 5/18
[52] U.S. Cl. .......................... 428/220; 525/240; 525/320; 525/321; 525/324
[58] Field of Search .......................... 428/220; 525/240, 525/53, 320, 321

[56] References Cited

U.S. PATENT DOCUMENTS

| | | | |
|---|---|---|---|
| 4,438,238 | 3/1984 | Fukushima et al. | 525/240 |
| 5,082,902 | 1/1992 | Gurevitch et al. | 525/240 |
| 5,102,955 | 4/1992 | Calabro et al. | 525/240 |
| 5,126,398 | 6/1992 | Lee et al. | 525/53 |
| 5,284,613 | 1/1994 | Ali et al. | 264/566 |

FOREIGN PATENT DOCUMENTS

| | | |
|---|---|---|
| 503791 | 9/1992 | European Pat. Off. . |
| 528523 | 2/1993 | European Pat. Off. . |
| 58008712 | 1/1983 | Japan . |
| 93-07210 | 4/1993 | WIPO . |

*Primary Examiner*—Carman J. Seccuro, Jr.
*Attorney, Agent, or Firm*—Saul R. Bresch

[57] ABSTRACT

A film comprising a blend of copolymers, which has been extruded (i) to a film having a gauge of less than about 1.8 mils; a dart impact strength of at least about 80 grams per mil at a density of 0.926 gram per cubic centimeter; and a dart impact strength of at least about 480 grams per mil at a density of 0.918 gram per cubic centimeter and/or (ii) to a film having a gauge of less than about 5 mils, and a blocking force of less than about 120 grams and a COF in the range of about 0.2 to about 0.5, said blend having been produced in situ by contacting ethylene and at least one alpha-olefin comonomer with a magnesium/titanium based catalyst system in each of two reactors connected in series, under polymerization conditions, wherein the polymer formed in the high molecular weight reactor has a flow index in the range of about 0.01 to about 30 grams per 10 minutes and a density in the range of about 0.860 to about 0.940 gram per cubic centimeter and the polymer formed in the low molecular weight reactor has a melt index in the range of about 50 to about 3000 grams per 10 minutes and a density in the range of about 0.900 to about 0.970 gram per cubic centimeter, the weight ratio of high molecular weight reactor polymer to low molecular weight reactor polymer being in the range of about 0.5:1 to about 2:1 with the proviso that for film (i), 1-butene is at least one of the comonomer(s) used in the low molecular weight reactor and is present in the in situ blend in a weight ratio of 1-butene to the other comonomer(s) in the range of about 0.001:1 to about 1.3:1, and for film (ii), the film is essentially free of antiblock and slip agents.

2 Claims, No Drawings

FILM EXTRUDED FROM AN IN SITU BLEND OF ETHYLENE COPOLYMERS

TECHNICAL FIELD

This invention relates to film extruded from a blend of ethylene copolymers prepared in a series of polymerization reactors.

BACKGROUND INFORMATION

There has been a rapid growth in the market for linear low density polyethylene (LLDPE), particularly resin made under mild operating conditions; typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process such as those described in U.S. Pat. Nos. 5,047,468 and 5,126,398. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two reactors connected in series, said catalyst system comprising: (i) a supported titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:
 (1) the alpha-olefin is present in a ratio of about 0.02 to about 3.5 moles of alpha-olefin per mole of ethylene; and
 (2) hydrogen is present in a ratio of about 0.05 to about 3 moles of hydrogen per mole of combined ethylene and alpha-olefin;

(d) in the low melt index reactor:
 (1) the alpha-olefin is present in a ratio of about 0.02 to about 3.5 moles of alpha-olefin per mole of ethylene; and
 (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, industry continues to seek films with characteristics tailored to particular applications. Two such applications are grocery sacks and consumer and institutional garbage bags, which require a film of thin gauge having high dart impact strength. Another such application is exemplified by overwrap bags, textile bags, yarn bags, rack and counter bags, and films on which printing is accomplished with water based inks. This application often requires film having low blocking without the addition of antiblock agents and a low coefficient of sliding friction (COF) without the addition of slip agents.

DISCLOSURE OF THE INVENTION

An object of this invention, therefore, is to provide a thin gauge film having high dart impact strength and/or a film, which possesses low blocking and low COF properties. Other objects and advantages will become apparent hereinafter.

According to the present invention such films have been discovered, the films being extruded from an in situ blend produced by a variation of the process outlined above. With regard to the high dart impact strength embodiment, the in situ blend contains ethylene, 1-butene, and one other alpha-olefin comonomer wherein the weight ratio of 1-butene to other comonomer is in the range of about 0.001:1 to about 1.3:1, and preferably in the range of about 0.001:1 to about 0.9:1. Surprisingly, it was found that for this particular in situ blend, the dart impact strength of thin gauge film produced therefrom increases dramatically as the density decreases in the 0.926 to 0.918 gram per cubic centimeter density range. This was unexpected particularly because even small amounts of 1-butene are known to have a negative effect on dart impact strength.

Dart impact strength (also referred to as dart drop or dart drop impact resistance) is a measure of the energy that causes a film to fail under specified conditions of impact of a free falling dart. It is determined under ASTM D-1709-90, and is measured in grams per mil. In testing for dart impact strength, the dart impact strength is not dependent on the directional orientation of the film.

The film comprises a blend of copolymers, which has been extruded to a gauge of less than about 1.8 mils, said film having a dart impact strength of at least about 80 grams per mil at a density of 0.926 gram per cubic centimeter and a dart impact strength of at least about 480 grams per mil at a density of 0.918 gram per cubic centimeter. The blend for this embodiment is produced in situ by contacting ethylene and at least one alpha-olefin comonomer with a magnesium/titanium based catalyst system in each of two reactors connected in series, under polymerization conditions, wherein the polymer formed in the high molecular weight reactor is based on ethylene and alpha-olefin comonomer(s) having 5 to 12 carbon atoms; has a flow index in the range of about 0.01 to about 30 grams per 10 minutes; and has a density in the range of about 0.860 to about 0.940 gram per cubic centimeter and the polymer formed in the low molecular weight reactor is based on ethylene and alpha-olefin comonomer(s) having 3 to 12 carbon atoms; has a melt index in the range of about 50 to about 3000 grams per 10 minutes; and has a density in the range of about 0.900 to about 0.970 gram per cubic centimeter, the weight ratio of high molecular weight reactor polymer to low molecular weight reactor polymer being in the range of about 0.5:1 to about 2:1 with the proviso that 1-butene is present in the in situ blend in a weight ratio of 1-butene to the other comonomer(s) in the range of about 0.001:1 to about 1.3:1.

With regard to the second embodiment, surprisingly, it was found that for a variation of the above described in situ blend, conventional extrusion used for linear low density polyethylene (LLDPE) results in a film having low blocking and low COF properties. The film comprises a blend of copolymers, which has been extruded to a gauge of less than about 5 mils, said film having a blocking force of less than about 120 grams and a COF in the range of about 0.2 to about 0.5, and said blend having been produced in situ as above wherein the alpha-olefin comonomer(s) in both reactors can have 3 to 12 carbon atoms; without the proviso regarding 1-butene; and with the proviso that the film is essentially free of antiblock and slip agents.

DESCRIPTION OF THE PREFERRED EMBODIMENT(S)

The gauge or thickness of the film, which is the subject of the first embodiment of this invention, is no greater than about 1.8 mils, and is preferably in the range of about 0.30 to about 1.8 mils. The optimum gauge is about 1.0 mil. In addition to the thin gauge, the film is defined by its dart impact strength, and the high 1-butene content of the in situ blend from which it is made. The film has a dart impact strength of at least about 80 grams per mil at a density of 0.926 gram per cubic centimeter, and preferably at least about 90 grams per mil at that density, and of at least about 480 grams per mil at a density of 0.918 gram per cubic centimeter, and preferably at least about 540 grams per mil at the lower density.

The gauge or thickness of the film, which is the second embodiment of this invention, is less than about 5 mils, and is preferably in the range of about 0.30 to about 4.0 mils. In addition to the gauge, the film is defined by a blocking force of less than about 120 grams and a COF in the range of about 0.2 to about 0.5. Blocking is adhesion between contacting layers of film, and the blocking force (or the force of the adhesion) is determined in grams under ASTM D-1893-85. The lower the blocking force, the less the adhesion. A blocking force of less than about 120 grams is necessary to avoid the need for antiblock agents. COF is the ratio of the frictional force, which arises when one surface slides over an adjoining parallel surface, to the normal force, usually gravitational, acting perpendicular to the adjoining surfaces. The lower the COF, the easier it is for one surface to slide over the other. A COF in the range of about 0.2 to about 0.5 is necessary to avoid the need for slip agents.

As noted, the film is formed by extrusion. The extruder is a conventional one using a die, which will provide the desired gauge. Examples of various extruders, which can be used in forming the film are the single screw type modified with a blown film die and air ring and continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 175 to about 280 degrees C, and is preferably carried out at temperatures in the range of about 190 to about 250 degrees C.

The blend, which is used in the extruder, is produced in two staged reactors connected in series wherein a mixture of resin and catalyst precursor is transferred from the first reactor to the second reactor in which another copolymer is prepared and blends in situ with the copolymer from the first reactor.

The copolymers produced in each of the reactors are copolymers of ethylene and at least one alpha-olefin comonomer. The relatively high molecular weight copolymer is produced in what is referred to as the high molecular weight reactor, and the relatively low molecular weight copolymer is produced in what is referred to as the low molecular weight reactor. In the first embodiment (dart impact strength), 1-butene is used in the low molecular weight reactor. The alpha-olefin comonomer(s), which can be present in the high molecular weight reactor, can have 5 to 12 carbon atoms, and preferably 5 to 8 carbon atoms. The alpha-olefin comonomer(s), which can be present in the low molecular weight reactor, can have 3 to 12 carbon atoms, and preferably 3 to 8 carbon atoms. The alpha-olefins are exemplified by propylene, 1-butene, 1-hexene, 4-methyl-1-pentene, or 1-octene with the proviso that the 1-butene is present in the blend in a weight ratio of 1-butene to the other comonomer of about 0.001:1 to about 1.3:1, and preferably about 0,001:1 to about 0.9:1. In the second embodiment (anti-block and COF), alpha-olefin comonomer(s) having 3 to 12 carbon atoms, preferably 3 to 8 carbon atoms, can be used in either reactor, and 1-butene is not required. Therefore, in this embodiment, any of the aforementioned comonomers can be used in either reactor.

Preferred first embodiment comonomer combinations:

| high mol wt reactor | low mol wt reactor |
|---|---|
| 1-hexene | 1-butene |

Preferred second embodiment comonomer combinations are the same as above together with 1-butene/1-butene; 1-butene/1-hexene; and 1-hexene/1-hexene combinations.

The 1-hexene/1-butene combination is found to provide acceptable properties while still meeting FDA specifications since a terpolymer increases the FDA allowable comonomer content, e.g., for a 1-hexene copolymer, the maximum allowable comonomer content is 10 percent by weight whereas for a 1-hexene/1-butene terpolymer, the maximum allowable comonomer content is 15 percent by weight. For FDA purposes, a 1-hexene/1-butene combination is considered a terpolymer.

It will be understood that the in situ blend can be characterized as a bimodal resin. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

The magnesium/titanium based catalyst system can be exemplified by the catalyst system described in U.S. Pat. No. 4,302,565 although the precursor is preferably unsupported. Another preferred catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about I to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1 and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is preferably prepared in the first reactor, and the relatively high melt index (or low molecular weight) copolymer is prepared in the second reactor. This can be referred to as the forward mode. Alternatively, the relatively low molecular weight copolymer can be prepared in the first reactor and the relatively high molecular weight copolymer can be prepared in the second reactor. This can be referred to as the reverse mode.

The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium.

In the high molecular weight reactor:

Because of the low values, instead of melt index, flow index is determined and those values are used in this specification. The flow index can be in the range of about 0.01 to about 30 grams per 10 minutes, and is preferably in the range of about 0.2 to about 1.0 gram per 10 minutes. The molecular weight of this polymer is, generally, in the range of about 425,000 to about 480,000. The density of the copolymer is at least 0.860 gram per cubic centimeter, and is preferably in the range of 0.900 to 0.930 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 50 to about 3000 grams per 10 minutes, and is preferably in the range of about 100 to about 1500 grams per 10 minutes. The molecular weight of the high melt index copolymer is, generally, in the range of about 14,000 to about 30,000. The density of the copolymer prepared in this reactor can be at least 0.900 gram per cubic centimeter, and is preferably in the range of 0.905 to 0.945 gram per cubic centimeter. The melt flow ratio of this copolymer can be in the range of about 20 to about 70, and is preferably about 20 to about 45.

The blend or final product, as removed from the second reactor, can have a flow index in the range of about 5 to about 45 grams per 10 minutes, and preferably has a flow index in the range of about 6 to about 20 grams per 10 minutes. The melt flow ratio can be in the range of about 75 to about 185. The molecular weight of the final product is, generally, in the range of about 200,000 to about 375,000. The density of the blend can be at least 0.908 gram per cubic centimeter, and is preferably in the range of 0.910 to 0.930 gram per cubic centimeter.

The blend has a broad molecular weight distribution which can be characterized as bimodal. The broad molecular weight distribution is reflected in an Mw/Mn ratio of about 12 to about 44, preferably about 13 to about 40. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.5:1 to about 2:1. For the first embodiment, the weight ratio is preferably in the range of about 1:1 to about 1.6:1, and the optimum weight ratio is about 1.4:1. For the second embodiment, the weight ratio is preferably in the range of about 0.67:1 to about 1.63:1, and the optimum weight ratio is in the range of about 1.08:1 to about 1.38:1.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor:

The mole ratio of alpha-olefin to ethylene can be in the range of about 0.05:1 to about 0.4:1, and is preferably in the range of about 0.09:1 to about 0.26:1. The mole ratio of hydrogen (if used) to ethylene can be in the range of about 0.0001:1 to about 0.3:1, and is preferably in the range of about 0.001:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor:

The mole ratio of alpha-olefin to ethylene can be in the range of about 0.1:1 to about 0.6:1, and is preferably in the range of about 0.2:1 to about 0.45:1. The mole ratio of hydrogen to ethylene can be in the range of about 1:1 to about 2.5:1, and is preferably in the range of about 1.7:1 to about 2.2:1. The operating temperature is generally in the range of about 70° C. to about 100° C. As mentioned above, the temperature is preferably varied with the desired density.

The pressure is generally the same in both the first and second reactors. The pressure can be in the range of about 200 to about 450 psi and is preferably in the range of about 280 to about 350 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Advantages of the first embodiment of the invention lie in the high dart impact strength at densities in the range of 0.918 to 0.926 gram per cubic centimeter in an in situ blend of resins containing significant amount of 1-butene. The blends can be extruded on a standard LLDPE line with a wide die gap, e.g., of about 100 mils, and can be processed in the pocket mode. Alternatively, the film can be processed on the same line from a narrow die gap in the pocket mode, or on the same line from a wide or narrow die gap, but in a high stalk mode in a similar manner to the processing of high density polyethylene(HDPE). Advantages of the second embodiment lie in that the blocking and COF properties of the film are so low that the use of antiblock and slip agents can be avoided.

Patents mentioned in this specification are incorporated by reference herein.

The invention is illustrated by the following examples.

EXAMPLES I TO IV

The preferred catalyst system is one where the precursor is formed by spray drying and is used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 ('745). The catalyst composition and method of preparing same used in these examples is of the same composition and preparation method as example 1 of '745 except that diethylaluminum chloride and tri-n-hexylaluminum are not used.

Polyethylene is produced using the following standard procedure. With respect to reaction conditions, the variables are set forth in the Tables as well as resin and film properties. Each example is provided with its own Table.

Ethylene is copolymerized with 1-hexene and 1-butene. Triethylaluminum (TEAL) cocatalyst is added to each reactor during polymerization as a 5 weight percent solution in isopentane. The pressure in each reactor is 300 psia. Each polymerization is continuously conducted after equilibrium is reached under conditions set forth in the Tables.

Polymerization is initiated in the first reactor by continuously feeding the above catalyst precursor and cocatalyst triethylaluminum (TEAL), and into a fluidized bed of polyethylene granules together with ethylene, 12hexene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Ethylene, 1-butene, and hydrogen are introduced into the second reactor where they come into contact with the copolymer and catalyst from the first reactor. Additional cocatalyst is also introduced. The product blend is continuously removed.

TABLE I

| | EXAMPLE I | | |
|---|---|---|---|
| reaction conditions | first reactor | second reactor | final product |
| temperature (°C.) | 62 | 85 | — |
| pressure (psia) | 300 | 300 | — |
| C2 partial pressure (psia) | 28.5 | 48 | — |
| H2/C2 molar ratio | 0.0008 | 1.82 | — |
| comonomer/C2 molar ratio | 0.19 | 0.20 | — |
| catalyst precursor feed rate (cc/hr) | 5,500 | — | — |

TABLE I-continued

EXAMPLE I

| reaction conditions | first reactor | second reactor | final product |
|---|---|---|---|
| TEAL feed rate (cc/hr) | 240 | 240 | — |
| production rate (lbs/hr) | 27.9 | 15.7 | — |
| bed weight (lbs) | 80 | 110 | — |
| bed volume (cubic feet) | 5.88 | 7.22 | |
| residence time (hrs) | 2.87 | 2.52 | — |
| space/time yield (lbs/hr/cu ft) | 4.74 | 2.18 | |
| recycle isopentane (mol %) | 6.1 | — | — |
| isopentane feed rate (lbs/hr) | 3.5 | — | — |
| resin properties | | | |
| flow index (g/10 min) | 0.7 | — | 9.2 |
| melt index (g/10 min) | — | 500 | — |
| density (g/cc) | 0.902 | 0.934 | 0.9182 |
| residual titanium (ppm) | 3.31 | 2.14 | — |
| bulk density (lbs/cu ft) | 20.3 | 22.75 | — |
| average particle size (inch) | 0.0185 | 0.02 | — |
| split (% by wt) | 62 | 38 | — |
| weight ratio of 1-butene to 1-hexene | — | — | 0.22 |
| molecular weight distribution | | | |
| Mw | — | — | 304,000 |
| Mn | — | — | 14,340 |
| Mw/Mn | — | — | 21.2 |
| C13 NMR | | | |
| ethyl branches (wt %) | — | — | 1.98 |
| butyl branches (wt %) | — | — | 9.02 |
| key film properties: | | | |
| COF static | — | — | 0.46 |
| induced film blocking (1 kg at 60° C. for 1 day) (grams) | — | — | 25 |
| dart impact strength (grams), A Scale | — | — | 845 |

TABLE II

EXAMPLE II

| reaction conditions | first reactor | second reactor | final product |
|---|---|---|---|
| temperature (°C.) | 70 | 85 | — |
| pressure (psia) | 305 | 300 | — |
| C2 partial pressure (psia) | 25 | 49.5 | — |
| H2/C2 molar ratio | 0.009 | 1.8 | — |
| comonomer/C2 molar ratio | 0.195 | 0.222 | — |
| catalyst precursor feed rate (cc/hr) | 7000 | — | — |

TABLE II-continued

EXAMPLE II

| reaction conditions | first reactor | second reactor | final product |
|---|---|---|---|
| TEAL feed rate (cc/hr) | 240 | 240 | — |
| production rate (lbs/hr) | 29.6 | 16.7 | — |
| bed weight (lbs) | 80 | 110 | — |
| bed volume (cubic feet) | 5.69 | 7.14 | |
| residence time (hrs) | 2.70 | 2.38 | — |
| space/time/yield (lbs/hr/cu ft) | 5.21 | 2.34 | |
| recycle isopentane (mol %) | 6.2 | — | — |
| isopentane feed rate (lbs/hr) | 3.5 | — | — |
| resin properties | | | |
| flow index (g/10 min) | 1.0 | — | 14.0 |
| melt index (g/10 min) | — | 500 | — |
| density (g/cc) | 0.903 | 0.934 | 0.920 |
| residual titanium (ppm) | 3.725 | 2.35 | — |
| bulk density (lbs/cu ft) | 21 | 23 | — |
| average particle size (inch) | 0.0185 | 0.0018 | — |
| split (% by wt) | 60 | 40 | — |
| weight ratio of 1-butene to 1-hexene | — | — | 0.24 |
| molecular weight distribution | | | |
| Mw | — | — | 284,000 |
| Mn | — | — | 14,900 |
| Mw/Mn | — | — | 19.1 |
| C13 NMR | | | |
| ethyl branches (wt %) | — | — | 1.94 |
| butyl branches (wt %) | — | — | 8.17 |
| key film properties: | | | |
| COF static | — | — | 0.41 |
| induced film blocking (1 kg at 60° for 1 day) (grams) | — | — | less than 10 |
| dart impact strength (grams), A Scale | — | — | 254 |

TABLE III

EXAMPLE III

| reaction conditions | first reactor | second reactor | final product |
|---|---|---|---|
| temperature (°C.) | 87 | 83 | — |
| pressure (psia) | 262 | 272 | — |
| C2 partial pressure (psia) | 21.2 | 69.2 | — |
| H2/C2 molar ratio | 0.002 | 1.71 | — |
| comonomer/C2 molar ratio | 0.149 | 0.349 | — |
| catalyst precursor feed rate (lbs/hr) | 12.9 | — | — |
| TEAL feed rate | 83 | 48 | — |

TABLE III-continued

EXAMPLE III

| reaction conditions | first reactor | second reactor | final product |
|---|---|---|---|
| (lbs/hr) | | | |
| ethylene feed (lbs/hr) | 17,950 | 11,710 | — |
| 1-butene feed (lbs/hr) | — | 1,825 | — |
| 1-hexene feed (lbs/hr) | 1,600 | — | — |
| hydrogen feed (lbs/hr) | — | >71 | — |
| superficial gas velocity (ft/sec) | 2.01 | 1.88 | |
| catalyst productivity (lbs/lb) | 1527 | 2,519 | |
| production rate (lbs/hr) | 19,700 | 12,950 | — |
| bed weight (lbs) | 56,000 | 71,000 | |
| bed level (ft) | 38.5 | 40.4 | |
| residence time (hrs) | 2.85 | 2.18 | — |
| space/time/yield (lbs/hr/cu ft) | 5.5 | 3.25 | |
| resin properties | | | |
| flow index (g/10 min) | 0.42 | — | 8.9 |
| melt index (g/10 min) | — | 700 | — |
| density (g/cc) | 0.915 | 0.929 | 0.923 |
| residual titanium (ppm)-calculated | 3.92 | 2.37 | — |
| split (% by wt) | 60.5 | 39.5 | — |
| weight ratio of 1-butene to 1-hexene | — | — | 0.8 |
| molecular weight distribution | | | |
| Mw | — | — | 356,400 |
| Mn | — | — | 9,100 |
| Mw/Mn | — | — | 39.1 |
| C13 NMR | | | |
| ethyl branches (wt %) | — | — | 4.26 |
| butyl branches (wt %) | — | — | 5.32 |
| key film properties: | | | |
| COF static | — | — | 0.21 |
| induced film blocking (1 kg at 60° C. for 1 day) (grams) | — | — | less than 10 |
| dart impact strength (grams), A Scale | — | — | 175 |

TABLE IV

EXAMPLE IV

| reaction conditions | first reactor | second reactor | final product |
|---|---|---|---|
| temperature (°C.) | 70 | 85 | — |
| pressure (psia) | 305 | 300 | — |
| C2 partial pressure (psia) | 35 | 62 | — |
| H2/C2 molar ratio | 0.027 | 1.86 | — |
| comonomer/C2 molar ratio | 0.12 | 0.51 | — |

TABLE IV-continued

EXAMPLE IV

| reaction conditions | first reactor | second reactor | final product |
|---|---|---|---|
| catalyst precursor feed rate (cc/hr) | 5,000 | — | — |
| TEAL feed rate (cc/hr) | 240 | 240 | — |
| production rate (lbs/hr) | 31.4 | 19.2 | — |
| bed weight (lbs) | 80 | 110 | — |
| bed volume (cubic feet) | 6.82 | 8.42 | — |
| residence time (hrs) | 2.55 | 2.17 | — |
| space/time/yield (lbs/hr/cu ft) | 4.60 | 2.28 | |
| recycle isopentane (mol %) | 6.1 | — | — |
| isopentane feed rate (lbs/hr) | 3.5 | — | — |
| resin properties | | | |
| flow index (g/10 min) | 0.55 | — | 11.4 |
| melt index (g/10 min) | — | 500 | — |
| density (g/cc) | 0.919 | 0.932 | 0.926 |
| residual titanium (ppm) | 2.78 | 1.735 | — |
| bulk density (lbs/cu ft) | 17.5 | 19.5 | |
| average particle size (inch) | 0.025 | 0.026 | — |
| split (% by wt) | 61 | 39 | — |
| weight ratio of 1-butene to 1-hexene | — | — | 0.88 |
| molecular weight distribution | | | |
| Mw | — | — | 264,800 |
| Mn | — | — | 14,150 |
| Mw/Mn | — | — | 18.7 |
| C13 NMR | | | |
| ethyl branches (wt %) | — | — | 3.54 |
| butyl branches | — | — | 4.03 |
| key film properties: | | | |
| COF static | — | — | 0.29 |
| induced film blocking (1 kg at 60° C. for 1 day) (grams) | — | — | less than 10 |
| dart impact strength (grams) A Scale | — | — | 95 |

TABLE V

EXAMPLE V

| reaction conditions | first reactor | second reactor | final product |
|---|---|---|---|
| temperature (°C.) | 70 | 85 | — |
| pressure (psia) | 305 | 300 | — |
| C2 partial pressure (psia) | 33.5 | 60 | — |
| H2/C2 molar ratio | 0.045 | 2 | — |
| comonomer/C2 molar ratio | 0.25 | 0.20 | — |
| catalyst precursor feed | 11,000 | — | — |

TABLE V-continued

EXAMPLE V

| reaction conditions | first reactor | second reactor | final product |
|---|---|---|---|
| rate (cc/hr) | | | |
| TEAL feed rate (cc/hr) | 240 | 240 | — |
| production rate (lbs/hr) | 31.9 | 23.1 | — |
| bed weight (lbs) | 80 | 110 | — |
| bed volume (cubic feet) | 7.96 | 8.21 | — |
| residence time (hrs) | 2.51 | 2.00 | — |
| space/time yield (lbs/hr/cu ft) | 4.01 | 2.81 | — |
| resin properties | | | |
| flow index (g/10 min) | 6.4 | — | 125 |
| melt index (g/10 min) | — | 1 | — |
| density (g/cc) | 0.9025 | 0.9241 | 0.9241 |
| residual titanium (ppm) | 4.57 | 2.66 | — |
| bulk density (lbs/cu ft) | 15 | 20 | — |
| average particle size (inch) | 0.031 | 0.024 | — |
| molecular weight distribution | | | |
| Mw | — | — | 153,000 |
| Mn | — | — | 11,000 |
| Mw/Mn | — | — | 13.8 |
| key film properties: | | | |
| COF static | | | 0.49 |
| induced film blocking (1 kg at 60° C. for 1 day/ 30 days) (grams) | — | — | 58/119 |

Notes to Tables:

1. Values for the second reactor are theoretical values based on the assumption that the second reactor copolymer is produced independently.

2. In examples I to IV, the films are extruded in a 1.5 inch Sterling™ blown film extruder having a 100 mil die gap; a 3 inch die; and a L/D ratio of 24:1. The extruder is operated at a die rate of 2.5 pounds/hour/inch; at a melt temperature profile of 440° F.; and a blow up ratio of 2:1. A one mil film is produced. In example V, the film is extruded in a 3.5 inch Gloucester™ 24:1 L/D 6 inch blown film extruder having a 35 mil die gap. The extruder is operated at a die rate of 8 pounds/hour/inch; at a melt temperature profile of 400° C.; and a blow up ratio of 2.6.

3. Density is measured by producing a plaque in accordance with ASTM D-1928, procedure C, and then testing as is via ASTM D-1505.

4. Melt flow ratio is the ratio of flow index to melt index.

5. The molecular weight distribution is performed via Size Exclusion Chromatography using a Waters™ 150 C with trichlorobenzene as solvent at 140 degrees C with a broad molecular weight distribution standard and broad molecular weight distribution calibration method.

6. COF static is determined in accordance with ASTM D-1894. The static or starting COF (coefficient of friction) is related to the force required to begin movement of the surfaces relative to each other. It is selected over COF kinetic, which measures the force needed to sustain this movement, the values for COF kinetic being less than the values for COF static.

7. Induced film blocking is determined in accordance with ASTM D-1893.

8. The dart impact strength (dart drop) is determined in accordance with ASTM D-1709. Note the substantial increase in dart impact strength from the 0.926 g/cc density in example IV to the 0.9182 g/cc density in example I.

9. Die rate is defined as pounds per hour per inch of die circumference.

10. Frost line height is that distance off of the base of the die during which the polymer undergoes a phase transformation from a viscous liquid to a solid.

11. Blow up ratio is the ratio of the bubble diameter to the die diameter.

We claim:

1. A film comprising a blend of copolymers, which has been extruded to a gauge in the range of about 0.3 about 1.8 mils, said film having a dart impact strength of at least about 90 grams per rail at a blend density of 0.926 gram per cubic centimeter and a dart impact strength of at least about 540 grams per mil at a blend density of 0.918 gram per cubic centimeter, and said blend having been produced in situ by contacting ethylene and one or more alpha-olefin comonomers with a magnesium/titanium based catalyst system in each of two reactors connected in series, under polymerization conditions, wherein (i) the comonomer(s) in the high molecular weight reactor have 5 to 8 carbon atoms and the polymer formed in the high molecular weight reactor has a flow index in the range of about 0.2 to about 1 gram per 10 minutes and a density in the range of about 0.900 to about 0.930 gram per cubic centimeter and (ii) the comonomers in the low molecular weight reactor are 1-butene and, optionally, one or more 3 to 8 carbon atom alpha-olefins and the polymer formed in the low molecular weight reactor has a melt index in the range of about 100 to about 1500 grams per 10 minutes and a density in the range of about 0.905 to about 0.945 gram per cubic centimeter, the weight ratio of high molecular weight reactor polymer to the low molecular weight reactor polymer being in the range of about 0.8:1 to about 1.5:1 with the proviso that 1-butene is present in the in situ blend in a weight ratio of 1-butene to other comonomer(s) in the range of about 0.001:1 to about 0.9:1, and wherein the blend has a flow index in the range of about 5 to about 45 grams per 10 minutes; a melt flow ratio in the range of about 75 to about 185; a density in the range of 0.910 to 0.930 gram per cubic centimeter; and an Mw/Mn ratio in the range of about 12 to about 44; and the blend is produced under the following conditions:
   (i) in the high molecular weight reactor: the mole ratio of alpha-olefin to ethylene is in the range of about 0.05:1 to about 0.25:1 and the mole ratio of hydrogen, if used, to ethylene is in the range of about 0.001:1 to about 0.15:1; and
   (ii) in the low molecular weight reactor: the mole ratio of 1-butene to ethylene is in the range of about 0.1:1 to about 0.6:1 and the mole ratio of hydrogen to ethylene is in the range of about 1.0:1 to about 2.5:1.

2. A film comprising a blend of copolymers, which has been extruded to a gauge in the range of about 0.3 to about 1.8 mils, said film having a blocking force of less than about 120 grams and a COF in the range of about 0.2 to about 0.5, and said blend having been produced in situ by contacting ethylene and one or more alpha-olefin comonomers having 3 to 8 carbon atoms with a magnesium/titanium based catalyst system in each of two reactors connected in series, under polymerization conditions, wherein the polymer formed in the high molecular weight reactor has a flow index in the range of about 0.25 to about 12 grams per 10 minutes and a density in the range of 0.900 to 0.930 gram per cubic centimeter and the polymer formed in the low molecular weight reactor has a melt index in the range of about 50 to about 1500 grams per 10 minutes and a density in the range of about 0.905 to about 0.955 gram per cubic centimeter, the weight ratio of high molecular weight reactor polymer to low molecular weight reactor polymer being in the range of about 0.54:1 to about 1.86:1; and wherein the blend has a flow index in the range of about 5 to about 165 grams per 10 minutes; a melt flow ratio in the range of about 65 to about 185; a density in the range of 0.910 to 0.930 gram per cubic centimeter; and an $M_w/M_n$ ratio in the range of about 12 to about 44; and the blend is produced under the following conditions:
  (i) in the high molecular weight reactor; the mole ratio of 1-hexene to ethylene is in the range of about 0.05:1 to about 0.4;1 and the mole ratio of hydrogen to ethylene is in the range of about 0.001:1 to about 0.18;1; and
  (ii) in the low molecular weight reactor: the mole ratio of 1-butene to ethylene is in the range of about 0.1:1 to about 0.6:1 and the mole ratio of hydrogen to ethylene is in the range of about 1.0:1 to about 2.5:1 with the proviso that the film is essentially free of antiblock and slip agents.

\* \* \* \* \*